(12) United States Patent
Fujiwara (10) Patent No.: US 10,214,172 B2
(45) Date of Patent: Feb. 26, 2019

(54) VEHICLE SIDE AIRBAG DEVICE

(71) Applicant: TOYOTA JIDOSHA KABUSHIKI KAISHA, Aichi-ken (JP)

(72) Inventor: Yusuke Fujiwara, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 57 days.

(21) Appl. No.: 15/446,237

(22) Filed: Mar. 1, 2017

(65) Prior Publication Data

US 2017/0253213 A1 Sep. 7, 2017

(30) Foreign Application Priority Data

Mar. 2, 2016 (JP) ................................. 2016-040221

(51) Int. Cl.
*B60R 21/231* (2011.01)
*B60R 21/0136* (2006.01)
(Continued)

(52) U.S. Cl.
CPC .... *B60R 21/23138* (2013.01); *B60R 21/0136* (2013.01); *B60R 21/207* (2013.01); *B60R 21/233* (2013.01); *B60R 21/235* (2013.01); *B60R 21/237* (2013.01); *B60R 21/239* (2013.01); *B60R 21/2338* (2013.01); *B60R 21/262* (2013.01); *B60R 21/264* (2013.01); *B60R 2021/0006* (2013.01);
(Continued)

(58) Field of Classification Search
CPC ............ B60R 21/23138; B60R 21/207; B60R 21/233; B60R 21/2338; B60R 21/235; B60R 21/237; B60R 21/239; B60R 21/262; B60R 21/264; B60R 21/0136; B60R 2021/0006; B60R 2021/23538; B60R 2021/0048; B60R 2021/0055; B60R 2021/0058; B60R 2021/01013; B60R 2021/01286; B60R 2021/23146; B60R 2021/23382
See application file for complete search history.

(56) References Cited

U.S. PATENT DOCUMENTS 8,047,564 B2 * 11/2011 Kibat ................ B60R 21/23138
280/730.2
2006/0038386 A1 2/2006 Shibayama et al.
(Continued)

FOREIGN PATENT DOCUMENTS

JP 2006035988 A 2/2006
JP 2008302897 A 12/2008
(Continued)

*Primary Examiner* — Darlene P Condra
(74) *Attorney, Agent, or Firm* — Hauptman Ham, LLP (57) ABSTRACT

A vehicle side airbag device includes a side airbag, an inner tether that extends in the seat forward direction at the seat width direction inner side of the side airbag in the inflated and deployed state and has a distal end portion anchored to the side airbag, and an outer tether that extends outward in the seat width direction from the seat rear side of the side airbag in the inflated and deployed state and has a distal end portion anchored to the side airbag. An upper end portion of the distal end portion of the outer tether is positioned further toward an upper end side of the side airbag than an upper end portion of the distal end portion of the inner tether.

19 Claims, 7 Drawing Sheets

(51) Int. Cl.
*B60R 21/207* (2006.01)
*B60R 21/233* (2006.01)
*B60R 21/2338* (2011.01)
*B60R 21/235* (2006.01)
*B60R 21/237* (2006.01)
*B60R 21/239* (2006.01)
*B60R 21/262* (2011.01)
*B60R 21/264* (2006.01)
*B60R 21/00* (2006.01)
*B60R 21/01* (2006.01)
*B60R 21/26* (2011.01)

(52) U.S. Cl.
CPC ............ *B60R 2021/0041* (2013.01); *B60R 2021/0048* (2013.01); *B60R 2021/0055* (2013.01); *B60R 2021/0058* (2013.01); *B60R 2021/01013* (2013.01); *B60R 2021/01286* (2013.01); *B60R 2021/23146* (2013.01); *B60R 2021/23382* (2013.01); *B60R 2021/23386* (2013.01); *B60R 2021/23509* (2013.01); *B60R 2021/23538* (2013.01); *B60R 2021/26076* (2013.01)

(56) References Cited

U.S. PATENT DOCUMENTS

| | | | |
|---|---|---|---|
| 2008/0203710 A1* | 8/2008 | Kalliske | B60R 21/233 280/729 |
| 2010/0109303 A1* | 5/2010 | Abe | B60R 21/2338 280/739 |
| 2010/0194083 A1 | 8/2010 | Sugimoto et al. | |
| 2011/0049852 A1 | 3/2011 | Kibat et al. | |
| 2015/0197212 A1 | 7/2015 | Fujiwara | |
| 2015/0367803 A1* | 12/2015 | Fujiwara | B60R 21/207 280/728.2 |
| 2015/0367804 A1 | 12/2015 | Fujiwara | |
| 2015/0367806 A1 | 12/2015 | Fujiwara | |
| 2016/0368449 A1* | 12/2016 | Fujiwara | B60R 21/231 |
| 2017/0182969 A1* | 6/2017 | Fujiwara | B60R 21/23138 |

FOREIGN PATENT DOCUMENTS

| | | | | |
|---|---|---|---|---|
| JP | 2009137536 A | | 6/2009 | |
| JP | 2011057208 A | | 3/2011 | |
| JP | 2014-141159 A | | 8/2014 | |
| JP | 5835484 B2 | | 12/2015 | |
| JP | 2016007901 A | | 1/2016 | |
| JP | 2016107721 A | * | 6/2016 | ........... B60R 21/207 |

* cited by examiner

VEHICLE SIDE AIRBAG DEVICE

CROSS-REFERENCE TO RELATED APPLICATION

This application is based on and claims priority under 35 USC 119 from Japanese Patent Application No. 2016-040221 filed on Mar. 2, 2016, the disclosure of which is incorporated by reference herein.

BACKGROUND

Technical Field

The present disclosure relates to a vehicle side airbag device.

Related Art

Japanese Patent No. 5,835,484 describes a vehicle side airbag device where a side airbag stored inside a side portion of a seat back receives a supply of gas from an inflator to inflate and deploy to the side of a seated occupant and protect (restrain) a region from the shoulder to the waist of the seated occupant.

SUMMARY

A vehicle side airbag device according to an aspect of the disclosure includes a side airbag, an inner tether, and an outer tether. The side airbag is configured to be stored inside a side portion of a seat back of a vehicle seat and secured to a side frame of the seat back, and receive a supply of gas from an inflator to inflate and deploy to an inflated and deployed state on the side of a seated occupant on the vehicle seat and protect at least a region from the shoulder to the abdomen of the seated occupant. The inner tether has a base end portion configured to be anchored to the side frame, extends in the seat forward direction at the seat width direction inner side of the side airbag in the inflated and deployed state, has a distal end portion anchored to the side airbag, and is configured to be stretched at the time of the inflation and deployment of the side airbag. The outer tether has a base end portion configured to be anchored to the side frame, extends outward in the seat width direction from the seat rear side of the side airbag in the inflated and deployed state, has a distal end portion anchored to the side airbag, and is configured to be stretched at the time of the inflation and deployment of the side airbag. An upper end portion of the distal end portion of the outer tether is positioned further toward an upper end side of the side airbag than an upper end portion of the distal end portion of the inner tether.

A vehicle side airbag device according to another aspect of the disclosure includes a side airbag, an inner tether, and an outer tether. The side airbag is configured to be stored inside a side portion of a seat back of a vehicle seat and secured to a side frame of the seat back, and receive a supply of gas to inflate and deploy to an inflated and deployed state. The inner tether has a base end portion configured to be anchored to the side frame, extends in a seat forward direction at a seat width direction inner side of the side airbag in the inflated and deployed state, has a distal end portion anchored to the side airbag, and is configured to be stretched at a time of inflation and deployment of the side airbag. The outer tether has a base end portion configured to be anchored to the side frame, extends outward in a seat width direction from a seat rear side of the side airbag in the inflated and deployed state, has a distal end portion anchored to the side airbag, and is configured to be stretched at the time of the inflation and deployment of the side airbag. An upper end portion of the distal end portion of the outer tether is positioned further toward an upper end side of the side airbag than an upper end portion of the distal end portion of the inner tether.

A vehicle seat according to a further aspect of the disclosure includes a seat back having a side frame, a side airbag, an inner tether, and an outer tether. The side airbag is stored inside a side portion of the seat back, is secured to the side frame of the seat back, and is configured to receive a supply of gas from an inflator to inflate and deploy to an inflated and deployed state on a side of a seated occupant on the vehicle seat and protect at least a region from the shoulder to the abdomen of the seated occupant. The inner tether has a base end portion anchored to the side frame, extends in a seat forward direction at a seat width direction inner side of the side airbag in the inflated and deployed state, has a distal end portion anchored to the side airbag, and is configured to be stretched at a time of inflation and deployment of the side airbag. The outer tether that has a base end portion anchored to the side frame, extends outward in a seat width direction from a seat rear side of the side airbag in the inflated and deployed state, has a distal end portion anchored to the side airbag, and is configured to be stretched at the time of the inflation and deployment of the side airbag. An upper end portion of the distal end portion of the outer tether is positioned further toward an upper end side of the side airbag than an upper end portion of the distal end portion of the inner tether.

BRIEF DESCRIPTION OF THE DRAWINGS

Exemplary embodiments of the present disclosure will be described in detail based on the following figures, wherein.

DETAILED DESCRIPTION

First Embodiment

A vehicle far side airbag device 10 (hereinafter "the far side airbag device 10") serving as a vehicle side airbag device according to a first embodiment of the present disclosure will be described below using FIG. 1 to FIG. 5. Arrow FR, arrow UP, and arrow OUT appropriately shown in the drawings indicate a forward direction (traveling direction) of the vehicle, an upward direction of the vehicle, and an outward direction in the width direction of the vehicle, respectively. When description is given below simply using the directions of front/rear, right/left, and upper/ lower, unless otherwise specified these will be understood to mean front/rear in the vehicle forward and rearward direction, right/left in the vehicle rightward and leftward direction (vehicle width direction), and upper/lower in the vehicle height direction. Furthermore, there are cases where some reference signs are omitted from the drawings in order to make it easier to see what is shown in the drawings.

(Configuration)

Figure 1:
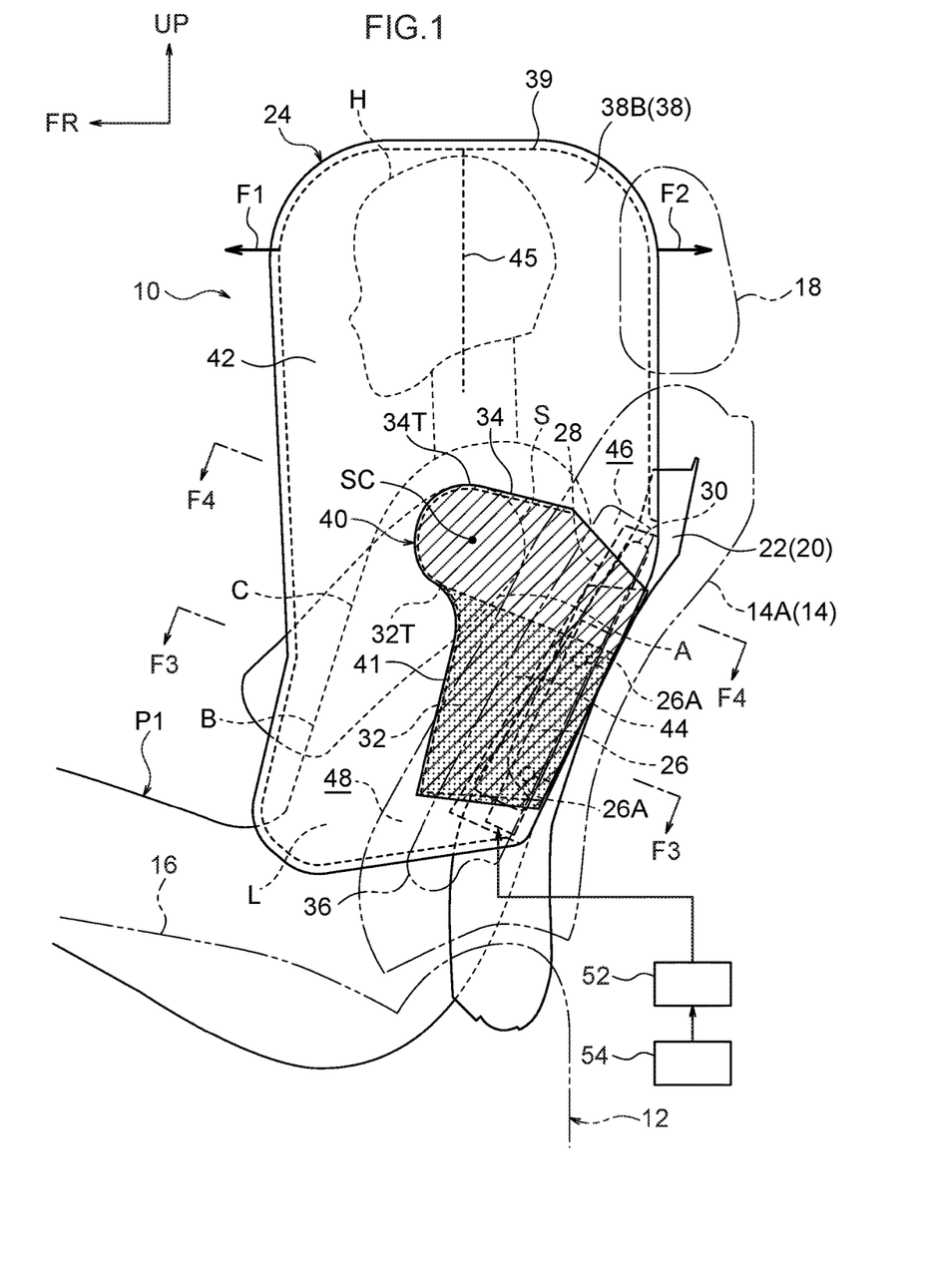
FIG. 1 is a side view of a vehicle seat in which a vehicle far side airbag device according to a first embodiment of the present disclosure is installed, and shows an inflated and deployed state of a far side airbag.
Figure 3:
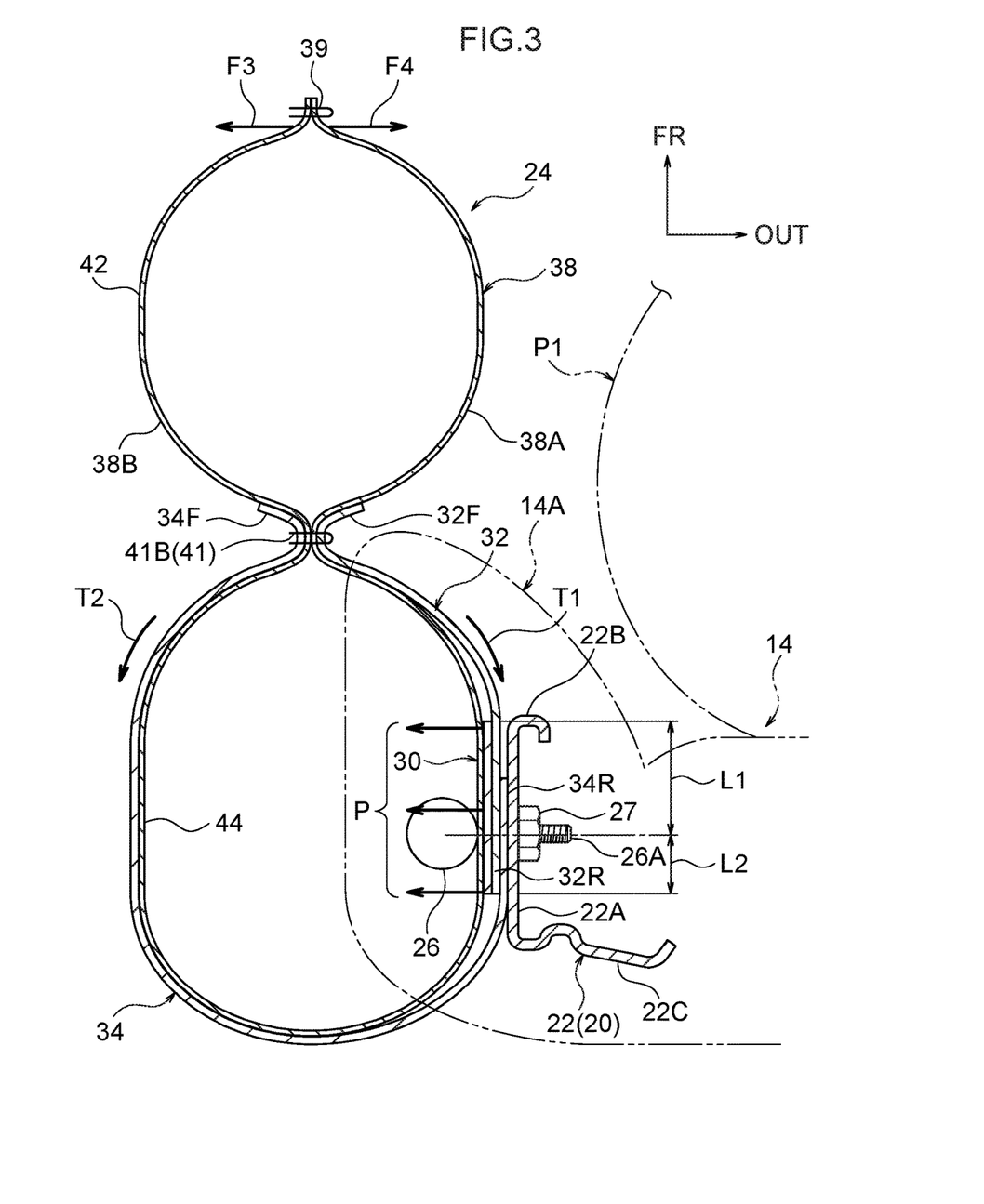
FIG. 3 is an enlarged cross-sectional view showing a cross section cut along line F3-F3 of FIG. 1.
Figure 4:
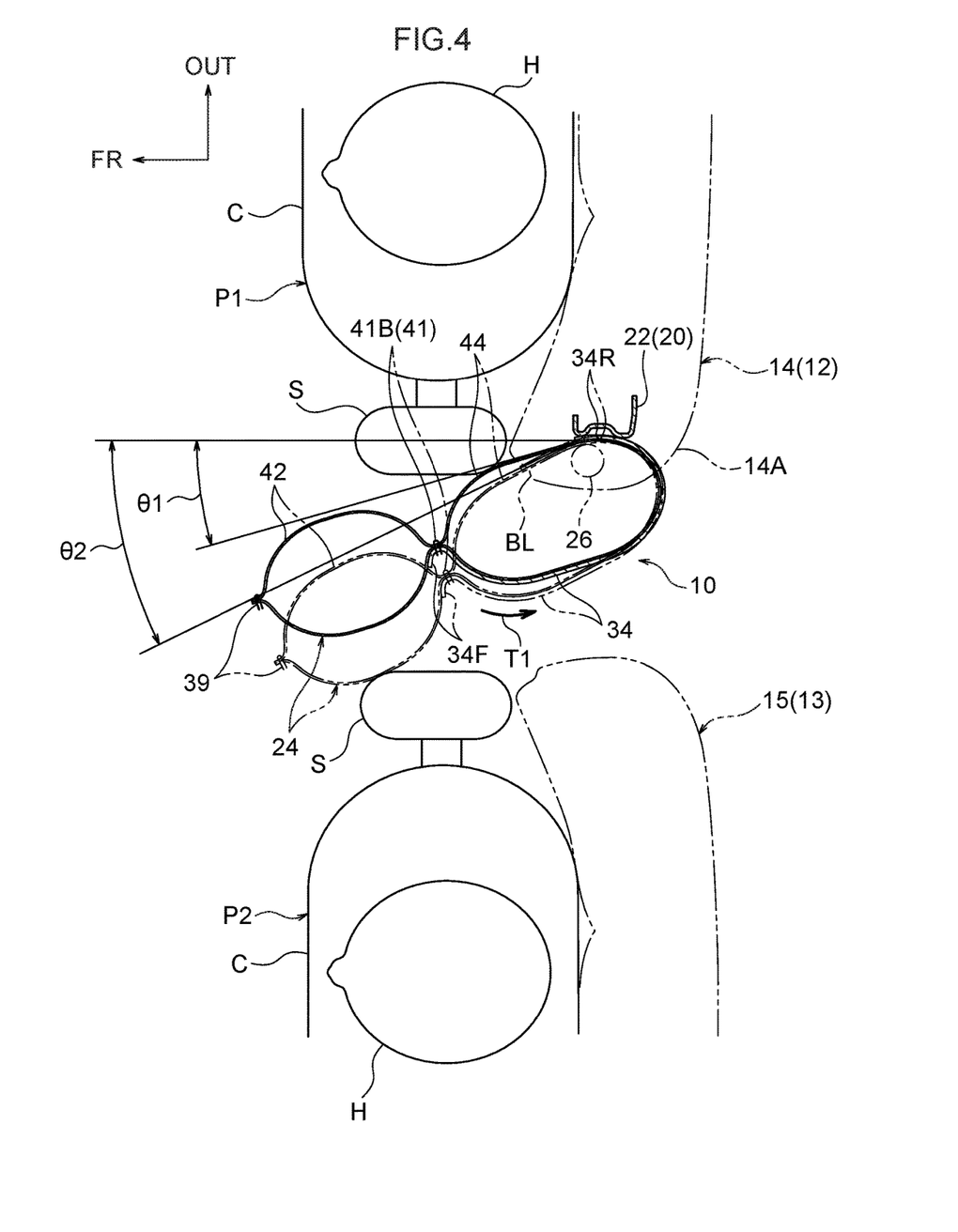
FIG. 4 is a cross-sectional view showing peripheral configurations including a cross section cut along line F4-F4 of FIG. 1.

As shown in FIG. 1, FIG. 3, and FIG. 4, the far side airbag device 10 according to the present embodiment is disposed in a side portion 14A (hereinafter "the central side portion 14A") on the vehicle width direction central side of a seat back 14 of a vehicle seat 12. The vehicle seat 12 is a driver's seat in a right-hand-drive car, for example, and is placed on a side (e.g., the right side) of a vehicle seat 13 that is a front passenger seat as shown in FIG. 4. The seat back 14 of the vehicle seat 12 is tiltably connected to the rear end portion of a seat cushion 16, and a head rest 18 (not shown in FIG. 4) is connected to the upper end portion of the seat back 14. In FIG. 4, reference sign 15 indicates the seat back of the vehicle seat 13. The seat back 15 of the vehicle seat 13A in some embodiments does not have a vehicle far side airbag device installed in it.

The seat back 14 of the vehicle seat 12 includes a seat back pad, which is put on a seat back frame 20 that is a frame member, and a seat cover, which covers the seat back pad (the seat back pad and the seat cover are not shown in the drawings). The seat back frame 20 is configured to include a central side frame 22 disposed inside the central side portion 14A and an outer side frame (not shown in the drawings) disposed inside a side portion on the vehicle width direction outer side of the seat back 14. As shown in FIG. 3, the central side frame 22 has a side wall portion 22A that extends in the seat forward and rearward direction as seen in a plan sectional view of the seat back 14, a front flange portion 22B that extends inward in the seat width direction from the front end of the side wall portion 22A, and a rear flange portion 22C that extends inward in the seat width direction from the rear end of the side wall portion 22A. In the present embodiment, the central side frame 22 corresponds to a "side frame" according to the present disclosure. Hereinafter, the central side frame 22 will simply be referred to as "the side frame 22."

In the present embodiment, the forward and rearward direction, the rightward and leftward direction (width direction), and the height direction of the vehicle seat 12 coincide with the forward and rearward direction, the rightward and leftward direction, and the height direction of the vehicle. Furthermore, in FIG. 1 and FIG. 4, a crash test dummy P1 is seated in the vehicle seat 12, and in FIG. 4 a crash test dummy P2 is seated in the vehicle seat 13. The dummies P1 and P2 are, for example, the World Side Impact Dummy (WorldSID) AM50 (representing a 50th percentile American adult male). The dummies P1 and P2 are seated in a standard sitting posture determined by crash test procedures. Furthermore, the front and rear position of the seat cushion 16 relative to the vehicle and the inclined position (angle of inclination) of the seat back 14 relative to the seat cushion 16 are adjusted to standard set positions corresponding to the sitting posture. The dummy P1 corresponds to a "seated occupant" according to the present disclosure. Hereinafter, the dummies P1 and P2 will be referred to as "the occupant P1" and "the occupant P2," respectively.

Figure 2:
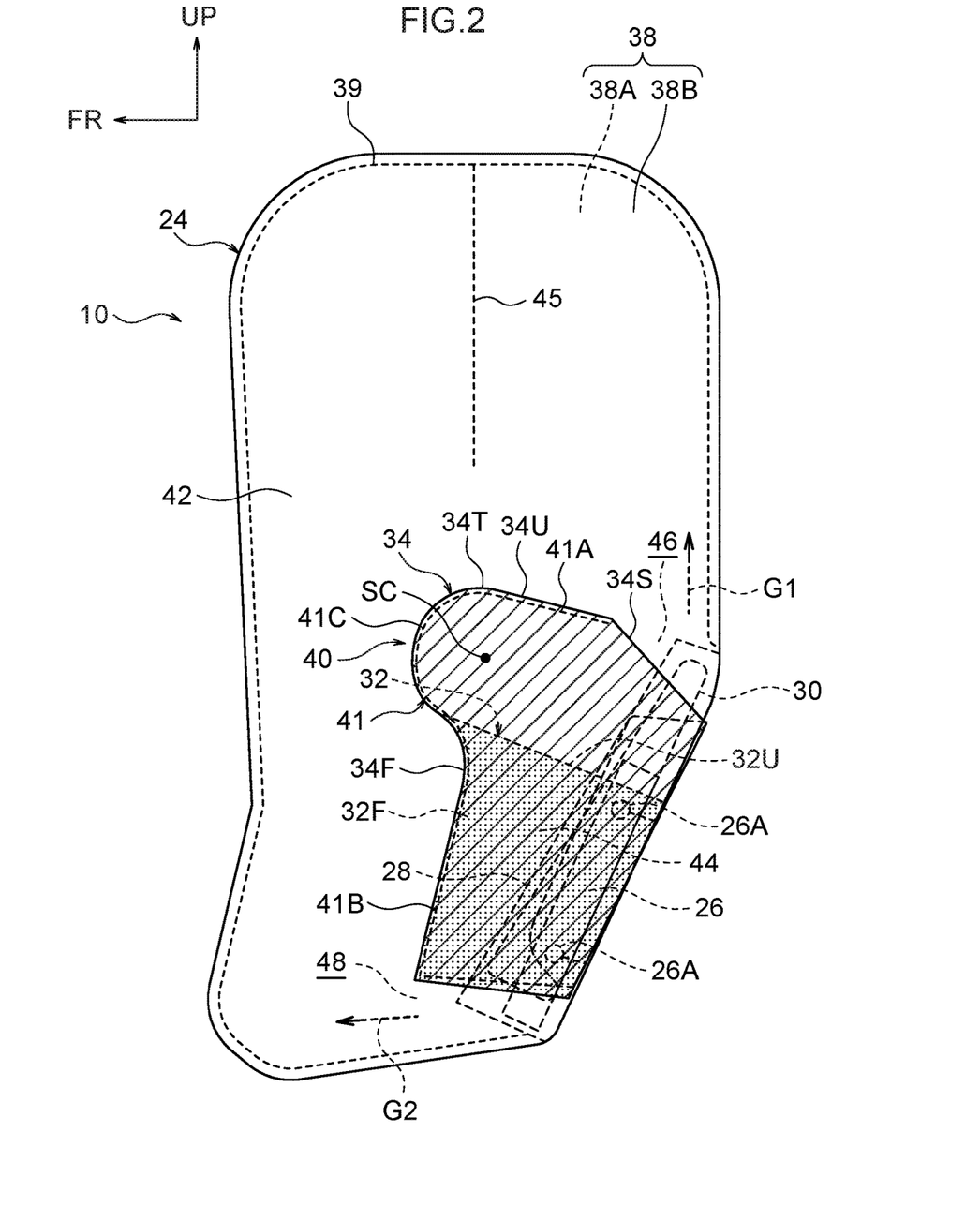
FIG. 2 is an enlarged side view showing a part of FIG. 1.
Figure 5:
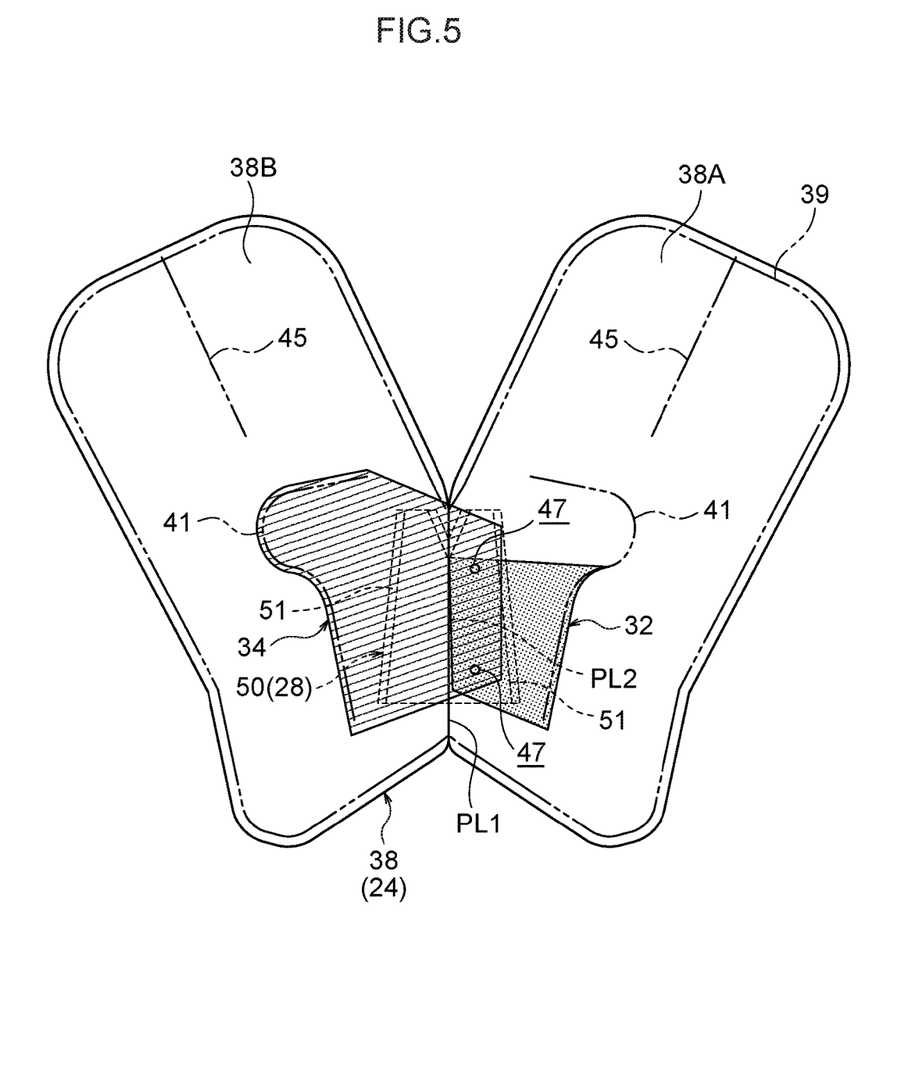
FIG. 5 is a spread-out view of the far side airbag according to the first embodiment.

As shown in FIG. 1 to FIG. 4, the far side airbag device 10 includes a far side airbag 24 (hereinafter "the side airbag 24") that is a bag, an inflator 26 that is housed inside the side airbag 24, and a diffuser 28 (not shown in FIG. 4) that regulates the flow of gas generated from the inflator 26. Moreover, the far side airbag device 10 includes a plate 30 (not shown in FIG. 4), for stabilizing the deployment behavior of the side airbag 24, and an inner tether 32 and an outer tether 34, for controlling the deployment direction of the side airbag 24 and stabilizing the deployment behavior of the side airbag 24. In FIG. 1, FIG. 2, and FIG. 5, dots are added to the inner tether 32 and hatching is added to the outer tether 34 in order to make it easier to recognize the inner tether 32 and the outer tether 34. Each of the constituent elements of the far side airbag device 10 will be described in detail below.

(Configuration of Side Airbag)

The side airbag 24 is normally modularized together with the inflator 26, the diffuser 28, the plate 30, the inner tether 32, and the outer tether 34 and folded up in a predetermined way of folding such as accordion folding or roll folding. Additionally, a long cuboid-shaped package 36 (shown only in FIG. 1) is formed by wrapping the folded-up side airbag 24 in a wrap that easily bursts. The package 36 is stored inside the central side portion 14A with its longitudinal direction lying along the height direction of the seat back 14 and is placed on the seat width direction outer side (vehicle width direction central side) of the side frame 22.

When the inflator 26 has been activated, the side airbag 24 becomes inflated and deployed to an inflated and deployed state on the side of the occupant P1 (here, the vehicle width direction central side of the occupant P1) by the pressure of the gas generated from the inflator 26 (see FIG. 1, FIG. 3, and FIG. 4). During this inflation and deployment, the seat back pad and the seat cover disposed in the central side portion 14A receive the inflation pressure of the side airbag 24 and burst. Specifically, the seat cover disposed in the central side portion 14A bursts at a burst line BL (see FIG. 4) set on the front end side of the side surface of the central side portion 14A.

Unless otherwise specified, the front, rear, right, left, upper, and lower directions cited in relation to the side airbag 24 in the following description indicate directions in a state in which the side airbag 24 is inflated and deployed, and these directions substantially coincide with the front, rear, right, left, upper, and lower directions of the vehicle seat 12. Furthermore, in the present embodiment, "inflated and deployed state" means a state in which the inflation and deployment of the side airbag 24 is completed (a completely inflated and deployed state) and "at the time of the inflation and deployment" includes both a state in which the side airbag 24 is in the process of being inflated and deployed and a state in which the side airbag 24 is completely inflated and deployed.

The side airbag 24 here is a so-called two chamber type airbag. The side airbag 24 is formed in the shape of a long bag by folding in two along a fold line PL1 a single base cloth 38 cut out in a substantially V-shape as shown in FIG. 5 and sewing the outer peripheral edge portion of the base cloth 38 at an outer peripheral seam 39. The base cloth 38 is formed by cutting out a flexible sheet-like material (e.g., a nylon or polyester cloth). The method of manufacturing the side airbag 24 is not limited to the above and can be appropriately changed. For example, in some embodiments, the side airbag 24 is manufactured by overlaying two base cloths on top of each other and sewing their outer peripheral edge portions together. Furthermore, for example, the side airbag 24 in some embodiments is manufactured by the double-weave technique (the so-called one-piece woven (OPW) technique) by a weaving machine.

As shown in FIG. 1, the side airbag 24 is formed in a long, substantially rectangular shape along the vehicle height direction when the side airbag 24 in the inflated and deployed state is viewed in the seat width direction. The side airbag 24 is formed in a size capable of protecting a region from a head H to a waist L of the occupant P1 (a region including the head H, a shoulder S, a chest C, an abdomen B, and the waist L). The size of the side airbag 24 is not limited to the above. For example, the size of the side airbag 24 in some embodiments is a size capable of protecting a region from the head H to the abdomen B.

Furthermore, as shown in FIG. 3, in the inflated and deployed state of the side airbag 24, a section 38A of the base cloth 38 on one side of the fold line PL1 faces inward in the seat width direction (the passenger P1's side: outward in the vehicle width direction) and a section 38B of the base cloth 38 on the other side of the fold line PL1 faces outward in the seat width direction (the vehicle width direction central side). In the following description, the section 38A on the one side will be referred to as "the inner portion 38A" and the section 38B on the other side will be referred to as "the outer portion 38B."

The side airbag 24 is partitioned by a partitioning portion 40 into a front bag portion 42, for protecting the head H and the front portions of the chest C, the abdomen B, and the waist L of the occupant P1, and a rear bag portion 44, for protecting the shoulder S and the rear portions of the chest C, the abdomen B, and the waist L of the occupant P1. Furthermore, the upper end side of the front bag portion 42 is partitioned into front and rear sections by a seam 45 that extends in the height direction of the side airbag 24.

The partitioning portion 40 is configured by a seam 41 where the base cloth 38 of the side airbag 24 is sewn, an upper communicating opening 46 and a lower communicating opening 48 (both of which are communicating openings). The seam 41 has an upper/lower partitioning portion 41A, which extends from the rear end side toward the central side of the side airbag 24 in the height direction middle portion of the side airbag 24, and a front/rear partitioning portion 41B, which extends from the lower end side toward the central side of the side airbag 24 in the forward and rearward direction middle portion of the side airbag 24. The upper/lower partitioning portion 41A partitions the rear portion of the side airbag 24 into upper and lower sections, and the front/rear partitioning portion 41B partitions the lower portion of the side airbag 24 into front and rear sections. Moreover, the seam 41 has a circular arc-shaped partitioning portion 41C that interconnects the upper end of the front/rear partitioning portion 41B and the front end of the upper/lower partitioning portion 41A.

As shown in FIG. 1, when the side airbag 24 in the inflated and deployed state is viewed in the seat width direction, the upper/lower partitioning portion 41A extends in the vehicle rearward direction from the vicinity of the upper end of the shoulder S of the occupant P1, and the front/rear partitioning portion 41B opposes the forward and rearward direction central portions of the chest C and the abdomen B of the occupant P1. Furthermore, the circular arc-shaped partitioning portion 41C is configured to have a circular arc shape that is centered on a center SC of the shoulder S (here, the axial center of a bolt disposed in the shoulder S of the dummy P1) and is rounded in the seat forward direction. In some embodiments, the circular arc-shaped partitioning portion 41C is omitted. In that case, the front/rear partitioning portion 41B is extended toward the upper end side of the side airbag 24, and the upper end portion of the front/rear partitioning portion 41B is connected to the front end portion of the upper/lower partitioning portion 41A.

The upper communicating opening 46 and the lower communicating opening 48 are so-called inner vent holes and are formed as a result of the seam 41 being partially omitted. The upper communicating opening 46 is set in the upper end portion of the partitioning portion 40 and allows the upper portion of the inside of the front bag portion 42 and the upper end portion of the inside of the rear bag portion 44 to be communicated with each other in the height direction of the side airbag 24 at the height direction middle portion of the rear end portion of the side airbag 24. Furthermore, the lower communicating opening 48 is set in the lower end portion of the partitioning portion 40 and allows the lower end portion of the inside of the front bag portion 42 and the lower end portion of the inside of the rear bag portion 44 to be communicated with each other in the forward and rearward direction of the side airbag 24 at the forward and rearward direction middle portion of the lower end portion of the side airbag 24. A tether (partitioning cloth: partitioning wall) disposed inside the side airbag 24 serves as the partitioning portion in some embodiments. In that case, communicating openings (apertures) are formed in the tether.

(Configurations of Inflator and Diffuser)

The inflator 26 and the diffuser 28 are housed in the rear end portion of the inside of the rear bag portion 44. The diffuser 28 is a member referred to in this technical field as a loop diffuser, an inner tube, a flow regulating cloth, etc. The diffuser 28 is formed in a long tubular shape by folding in two along a fold line PL2 a single base cloth 50 cut out in a substantially long rectangular shape as shown in FIG. 5 and sewing both edge portions of the base cloth 50 positioned on mutually opposite sides of the fold line PL2 to each other at a seam 51. The base cloth 50 of the diffuser 28 is configured by a flexible sheet-like material (here, the same cloth as that of the base cloth 38 of the side airbag 24, for example).

The diffuser 28 is placed with its axial direction lying along the height direction of the seat back 14. The diffuser 28 is formed in such a way that its diameter becomes larger heading from its upper end to its lower end, and the aperture area of a lower end aperture formed in the lower end is set larger than the aperture area of an upper end aperture formed in the upper end. As shown in FIG. 1 and FIG. 2, the dimension of the diffuser 28 in its longitudinal direction is set in such a way that the upper end aperture is positioned in the vicinity of the upper communicating opening 46 and the lower end aperture is positioned in the vicinity of the lower communicating opening 48. The diffuser 28 has the function of distributing up and down the gas generated from the inflator 26. In some embodiments, the diffuser 28 is formed with an unchanging diameter from its upper end to its lower end.

The inflator 26 is, in some embodiments, a so-called cylinder type gas generating device formed in a cylindrical shape. The inflator 26 is housed, on the inner side of the diffuser 28, with its axial direction lying along the height direction of the seat back 14. An upper and lower pair of stud bolts 26A (see FIG. 1 to FIG. 3) project inward in the seat width direction from the outer peripheral portion of the inflator 26. The stud bolts 26A penetrate the base cloth 50 of the diffuser 28, the base cloth 38 of the side airbag 24, and the side wall portion 22A of the side frame 22, and nuts 27 are screwed onto the distal end sides of the stud bolts 26A.

Because of this, the inflator 26 is fastened and secured to the side frame 22 together with the side airbag 24 and the diffuser 28.

An electronic control unit (ECU) 52 (a control device) installed in the vehicle is electrically connected to the inflator 26. A side impact sensor 54 that detects a side impact to the vehicle is electrically connected to the ECU 52. The ECU 52 and the side impact sensor 54 are constituent members of the far side airbag device 10. The ECU 52 activates (starts up) the inflator 26 when it detects a side impact to the vehicle on the basis of a signal from the side impact sensor 54. Specifically, because the far side airbag device 10 according to the present embodiment is installed in the vehicle seat 12 that is a driver's seat in a right-hand-drive vehicle, the inflator 26 is started up when the ECU 52 detects that another vehicle has crashed into the side portion (left side portion) on the front passenger seat side of the vehicle. In some embodiments where a pre-crash sensor that forecasts (predicts) a side impact is electrically connected to the ECU 52, the inflator 26 is started up when the ECU 52 forecasts a side impact on the basis of a signal from the pre-crash sensor.

When the inflator 26 starts up, gas is discharged into the diffuser 28 from a gas discharge portion disposed in one of the upper end portion and the lower end portion (here, the upper end portion, for example) of the inflator 26. The diffuser 28 is normally folded up together with the side airbag 24 and housed inside the central side portion 14A, but when the gas is discharged from the inflator 26 the diffuser 28 becomes inflated and deployed in a tubular shape by the pressure of the gas. Additionally, the diffuser 28 discharges gas G1 (see FIG. 2) from the upper end aperture toward the upper side of the seat back 14, and discharges gas G2 (see FIG. 2) from the lower end aperture toward the lower side of the seat back 14. The gas G1 discharged from the upper end aperture and the gas G2 discharged from the lower end aperture are supplied to the inside of the rear bag portion 44 and supplied through the upper communicating opening 46 and the lower communicating opening 48 to the inside of the front bag portion 42. Because of this, the side airbag 24 inflates and deploys. In this case, the rear bag portion 44 inflates and deploys earlier and to a higher pressure than the front bag portion 42.

(Configuration of Plate)

The plate 30 is formed in the shape of an elongated plate (here, in the shape of a flat plate, for example). The plate 30 is placed between the rear end portion of the rear bag portion 44 (the rear end portion of the lower portion of the side airbag 24) and the side wall portion 22A of the side frame 22, with its longitudinal direction lying along the height direction of the seat back 14 and with its plate thickness direction lying along the seat width direction. The plate 30 is formed in such a way that its dimension in the seat forward and rearward direction becomes smaller heading from its lower end side to its upper end side. Examples of materials for the plate 30 include steel, aluminum alloy, and carbon fiber-reinforced plastic.

The plate 30 is placed on the seat width direction inner side of the inflator 26 and extends in the upward direction of the seat back 14 beyond the inflator 26. The upper and lower stud bolts 26A of the inflator 26 penetrate the plate 30, and the plate 30 is fastened and secured to the side frame 22 using the upper and lower stud bolts 26A.

The plate 30 is disposed in such a way that, in the inflated and deployed state of the side airbag 42, its upper end is positioned in the vicinity of the upper end of the rear bag portion 44 and its lower end is positioned in the lower end portion of the rear bag portion 44. Furthermore, the front edge of the plate 30 is formed and set in such a way as to lie along the front edge of the side frame 22 when viewed in the seat width direction, and the plate 30 is configured to not project in the forward direction of the seat back 14 beyond the side frame 22. The rear edge of the plate 30 is positioned on the seat front side of the rear edge of the side frame 22, and the plate 30 is configured to not project in the rearward direction of the seat back 14 beyond the side frame 22.

(Configurations of Inner Tether and Outer Tether)

The inner tether 32 and the outer tether 34 are formed by cutting out in substantially rectangular shapes a cloth that is the same as that of the base cloth 38 of the side airbag 24, for example, and the outer tether 34 is formed larger than the inner tether 32. The material used for the inner tether 32 and the outer tether 34 is not limited to the above, and in some embodiments, it suffices for the material to be a flexible sheet-like material.

The inner tether 32 (inner stretching member) is disposed so as to be positioned on the seat width direction inner side (the occupant P1 side) of the side airbag 24 in the inflated and deployed state and overlies the rear bag portion 44 from the outer side. That is, the inner tether 32 overlies, from the outer side of the rear bag portion 44, a part of the inner portion 38A of the base cloth 38 that configures the rear bag portion 44 (see FIG. 3 and FIG. 5).

As shown in FIG. 2 and FIG. 3, a rear edge portion 32R, that is the base end portion of the inner tether 32, is placed between the side wall portion 22A of the side frame 22 and the rear bag portion 44 and extends in the height direction of the side airbag 24 along the rear end portion of the rear bag portion 44. The dimension of the rear edge portion 32R of the inner tether 32 in the height direction of the seat back 14 is set smaller than that of the plate 30, and the rear edge portion 32R is sandwiched between the plate 30 and the side wall portion 22A. The upper and lower stud bolts 26A of the inflator 26 penetrate the rear edge portion 32R of the inner tether 32. Because of this, the rear edge portion 32R of the inner tether 32 is anchored (secured) to the side frame 22 using the upper and lower stud bolts 26A of the inflator 26.

Furthermore, as shown in FIG. 2, a front edge portion 32F that is the distal end portion of the inner tether 32, extends in the height direction of the side airbag 24 along the front/rear partitioning portion 41B of the seam 41. The front edge portion 32F of the inner tether 32 is anchored (sewn) to the side airbag 24 at the front/rear partitioning portion 41B. Because of this, the inner tether 32 bridges, on the seat width direction inner side of the side airbag 24 in the inflated and deployed state, the seat width direction inner part of the front end portion of the rear bag portion 44 (the forward and rearward direction middle portion of the lower portion of the side airbag 24) and the side frame 22.

As shown in FIG. 1, the inner tether 32 is disposed so as to oppose the rear portions of the chest C and the abdomen B of the occupant P1 when the side airbag 24 in the inflated and deployed state is viewed in the seat width direction. In the inflated and deployed state, an upper edge portion 32U (reference sign 32U is indicated in FIG. 2 but omitted in FIG. 1) of the inner tether 32 slopes so as to extend obliquely downward in the seat rearward direction from the vicinity of an armpit A of the occupant P1, and a lower edge portion 32L (reference sign 32L is indicated in FIG. 2 but omitted in FIG. 1) of the inner tether 32 lies along the seat forward and rearward direction. Furthermore, the inner tether 32 is formed in such a way that, in the inflated and deployed state, an upper end portion 32T of the front edge portion 32F

(distal end portion) is positioned in the vicinity of the armpit A of the occupant P1 (on the seat lower side of the shoulder S).

The outer tether 34 (outer stretching member) is disposed so as to be positioned on the seat width direction outer side and the seat rear side of the side airbag 24 in the inflated and deployed state and in such a way that a part (the base end side) of the outer tether 34 is positioned on the seat width direction inner side, and the outer tether 34 overlies the rear bag portion 44 from the outer side. That is, the outer tether 34 overlies, from the outer side of the rear bag portion 44, a part of the outer portion 38B of the base cloth 38 that configures the rear bag portion 44, with a part of the outer tether 34 overlying, from the outer side of the rear bag portion 44, a part of the inner portion 38A of the base cloth 38 that configures the rear bag portion 44 (see FIG. 3 to FIG. 5).

As shown in FIG. 3 and FIG. 4, a rear edge portion 34R, that is the base end portion of the outer tether 34, is placed between the side wall portion 22A of the side frame 22 and the rear bag portion 44 and extends in the height direction of the side airbag 24 along the rear end portion of the rear bag portion 44. The rear edge portion 34R of the outer tether 34 is sandwiched between the plate 30 and the side wall portion 22A in a state in which the rear edge portion 32R of the inner tether 32 is interposed between the rear edge portion 34R of the outer tether 34 and the plate 30. The upper and lower stud bolts 26A of the inflator 26 penetrate the rear edge portion 34R of the outer tether 34. Because of this, the rear edge portion 34R of the outer tether 34 is anchored (secured) to the side frame 22 using the upper and lower stud bolts 26A of the inflator 26. Although in the present embodiment the rear edge portion 34R of the outer tether 34 is placed on the seat width direction inner side of the rear edge portion 32R of the inner tether 32, in some embodiments, the rear edge portion 34R is placed on the seat width direction outer side of the rear edge portion 32R.

Furthermore, as shown in FIG. 2, a front edge portion 34F of the outer tether 34 extends in the height direction of the side airbag 24 along the front/rear partitioning portion 41B and the circular arc-shaped partitioning portion 41C of the seam 41. Furthermore, an upper edge portion 34U of the outer tether 34 extends in the forward and rearward direction of the side airbag 24 along the upper/lower partitioning portion 41A. In the present embodiment, the front edge portion 34F and the upper edge portion 34U configure the distal end portion of the outer tether 34.

The front edge portion 34F of the outer tether 34 is anchored (sewn) to the side airbag 24 at the front/rear partitioning portion 41B and the circular arc-shaped partitioning portion 41C, and the upper edge portion 34U of the outer tether 34 is anchored (sewn) to the side airbag 24 at the upper/lower partitioning portion 41A. Because of this, the outer tether 34 bridges, from the seat rear side of the side airbag 44, the seat width direction outer part of the front end portion of the rear bag portion 44 (the forward and rearward direction middle portion of the lower portion of the side airbag 24) in the inflated and deployed state and the side frame 22. In some embodiments, the upper edge portion 34U of the outer tether 34 is not (anchored) sewn to the side airbag 24. In that case, the distal end portion of the outer tether 34 is configured by only the front edge portion 34F.

The outer tether 34 is disposed so as to overlie the inner tether 32 when the side airbag 24 in the inflated and deployed state is viewed in the seat width direction. However, the outer tether 34 is made larger (extended) on the upper end side of the side airbag 24 than the inner tether 32, and the upper edge portion 34U is positioned further toward the upper end side of the side airbag 24 than the upper edge portion 32U of the inner tether 32. Additionally, an upper end portion 34T of the distal end portion of the outer tether 34 is positioned further toward the upper end side of the side airbag 24 than the upper end portion 32T of the distal end portion of the inner tether 32. A lower edge portion 34L of the outer tether 34 is positioned at the same height as the lower edge portion 32L of the inner tether 32 in the height direction of the side airbag 24.

Furthermore, the upper portion of the front edge portion 34F of the outer tether 34 is curved in a circular arc shape along the circular arc-shaped partitioning portion 41C, and the upper portion of the outer tether 34 is made larger (extended) on the front end side of the side airbag 24 than the inner tether 32. Furthermore, a sloping edge portion 34S that extends obliquely downward in the seat rearward direction in the inflated and deployed state of the side airbag 24 is disposed between the rear end of the upper edge portion 34U and the upper end of the rear edge portion 34R.

As shown in FIG. 1, the outer tether 34 is disposed so as to oppose the shoulder S and the rear portions of the chest C and the abdomen B of the occupant P1 when the side airbag 24 in the inflated and deployed state is viewed in the seat width direction. In this inflated and deployed state, the upper edge portion 34U (reference sign 34U is indicated in FIG. 2 but omitted in FIG. 1) of the outer tether 34 slopes in such a way as to extend in the seat rearward direction and a little obliquely downward from the vicinity of the upper end of the shoulder S, and the lower edge portion 34L (reference sign 34L is indicated in FIG. 2 but omitted in FIG. 1) of the outer tether 34 extends in the substantially seat forward and rearward direction in the vicinity of the lower end of the abdomen B. Furthermore, in the inflated and deployed state, the upper end portion 34T of the outer tether 34 is positioned in the vicinity of the upper end of the shoulder S (on the seat upper side of the center SC of the shoulder S), and the upper portion side of the front edge portion 34F of the outer tether 34 is positioned on the seat front side of the center SC of the shoulder S.

The inner tether 32 and the outer tether 34 are disposed in such a way as to surround the periphery of the rear bag portion 44 as shown in FIG. 3, and the shapes and dimensions of the inner tether 32 and the outer tether 34 are set in such a way that the inner tether 32 and the outer tether 34 become stretched (receive tensile forces) at the time of the inflation and deployment of the side airbag 24. Specifically, the shapes and dimensions of the inner tether 32 and the outer tether 34 are set as follows when the inflated and deployed side airbag 24 is viewed in the height direction of the seat back 14 (see FIG. 3 and FIG. 4).

Namely, the substantial length (the length along the circumferential direction of the rear bag portion 44; the same holds true below) of the inner tether 32 between the front/rear partitioning portion 41B (the portion anchored to the side airbag 24) and the stud bolts 26A (the portion anchored to the side frame 22) is set shorter (e.g., about 10% shorter) than the substantial length, between the front/rear partitioning portion 41B and the stud bolts 26A, of the section of the rear bag portion 44 overlying the inner tether 32.

Similarly, the substantial length of the outer tether 34 between the front/rear partitioning portion 41B (the portion anchored to the side airbag 24) and the stud bolts 26A (the portion anchored to the side frame 22) is set shorter (e.g., about 20% shorter) than the substantial length, between the front/rear partitioning portion 41B and the stud bolts 26A, of the section of the rear bag portion 44 overlying the outer tether 34.

When the far side airbag device 10 having the above configuration is manufactured, first the inflator 26 is inserted inside the rear bag portion 44 from an inflator insertion opening (not shown in the drawings) formed in the rear end portion of the side airbag 24. Next, the upper and lower stud bolts 26A are inserted through upper and lower bolt holes (through holes not shown in the drawings; the same holds true below) formed in the rear end portion of the rear bag portion 44. Next, the upper and lower stud bolts 26A are inserted through upper and lower bolt holes formed in the plate 30. Next, the upper and lower stud bolts 26A are inserted through upper and lower bolt holes formed in the rear edge portion 32R of the inner tether 32. Next, the upper and lower stud bolts 26A are inserted through upper and lower bolt holes 47 (see FIG. 5) formed in the rear edge portion 34R of the outer tether 34. Thereafter, the side airbag 24 is folded up and wrapped by the wrap so that the package 36 is finished.

(Action and Effects)

Next, the action and effects of the present embodiment will be described.

In the far side airbag device 10 having the above configuration, the inflator 26 is started up when the ECU 52 detects a side impact on the basis of the signal from the side impact sensor 54, and gas is discharged from the gas discharge portion of the inflator 26 into the side airbag 24. Because of this, the side airbag 24 inflates and deploys on the vehicle width direction central side of the occupant P1, and the region from the head H to the waist L of the occupant P1 is protected (restrained) from the vehicle width direction central side by the side airbag 24.

Here, the far side airbag device 10 includes the inner tether 32 and the outer tether 34 that become stretched at the time of the inflation and deployment of the side airbag 24. The inner tether 32 has the rear edge portion 32R, which is the base end portion, anchored to the side frame 22 of the seat back 14, extends in the seat forward direction on the seat width direction inner side of the side airbag 24 in the inflated and deployed state, and has the front edge portion 32F, which is the distal end portion, anchored to the side airbag 24. The outer tether 34 has the rear edge portion 34R, which is the base end portion, anchored to the side frame 22, extends outward in the seat width direction from the seat rear side of the side airbag 24 in the inflated and deployed state, and has the front edge portion 34F and the upper edge portion 34U, which are the distal end portion, anchored to the side airbag 24. Additionally, the upper end portion 34T of the distal end portion of the outer tether 34 is positioned further toward the upper end side of the side airbag 24 than the upper end portion 32T of the distal end portion of the inner tether 32. Because of this, the deployment behavior of the side airbag 24 can be stabilized while preventing or inhibiting the side airbag 24 from catching on the rear side of the shoulder S at the time of the inflation and deployment.

Namely, further toward the upper end side of the side airbag 24 (here, the height of the shoulder S of the occupant P1) than the upper end portion 32T of the distal end portion of the inner tether 32, the deployment direction of the side airbag 24 is guided outward in the seat width direction by tensile force T1 (see FIG. 4) when the outer tether 34 becomes stretched. Because of this, the side airbag 24 can be prevented or inhibited from catching on the rear side of the shoulder S of the occupant P1 at the time of the inflation and deployment.

Meanwhile, further toward the lower end side of the side airbag 24 (here, the height from the waist L to the chest C of the occupant P1) than the upper end portion 32T of the distal end portion of the inner tether 32, the tensile force T1 when the outer tether 34 becomes stretched can be offset by tensile force T2 (see FIG. 3) when the inner tether 32 becomes stretched, and the side airbag 24 can be inflated and deployed in the normal direction (the seat forward direction). Moreover, back-and-forth swinging of the side airbag 24 in the seat forward and rearward direction at the time of the inflation and deployment can be inhibited by the tensile forces T1 and T2 of the outer tether 34 and the inner tether 32. That is, the stiffness of the side airbag 24 with respect to loads F1 and F2 (see FIG. 1) in the seat forward and rearward direction is improved (displacement is reduced) by the tensile forces T1 and T2 of the outer tether 34 and the inner tether 32, so the deployment behavior of the side airbag 24 can be stabilized. For the above reasons, according to the present embodiment, the deployment performance of the side airbag 24 that protects the region from the head H to the waist L of the occupant P1 can be improved.

Figure 6:
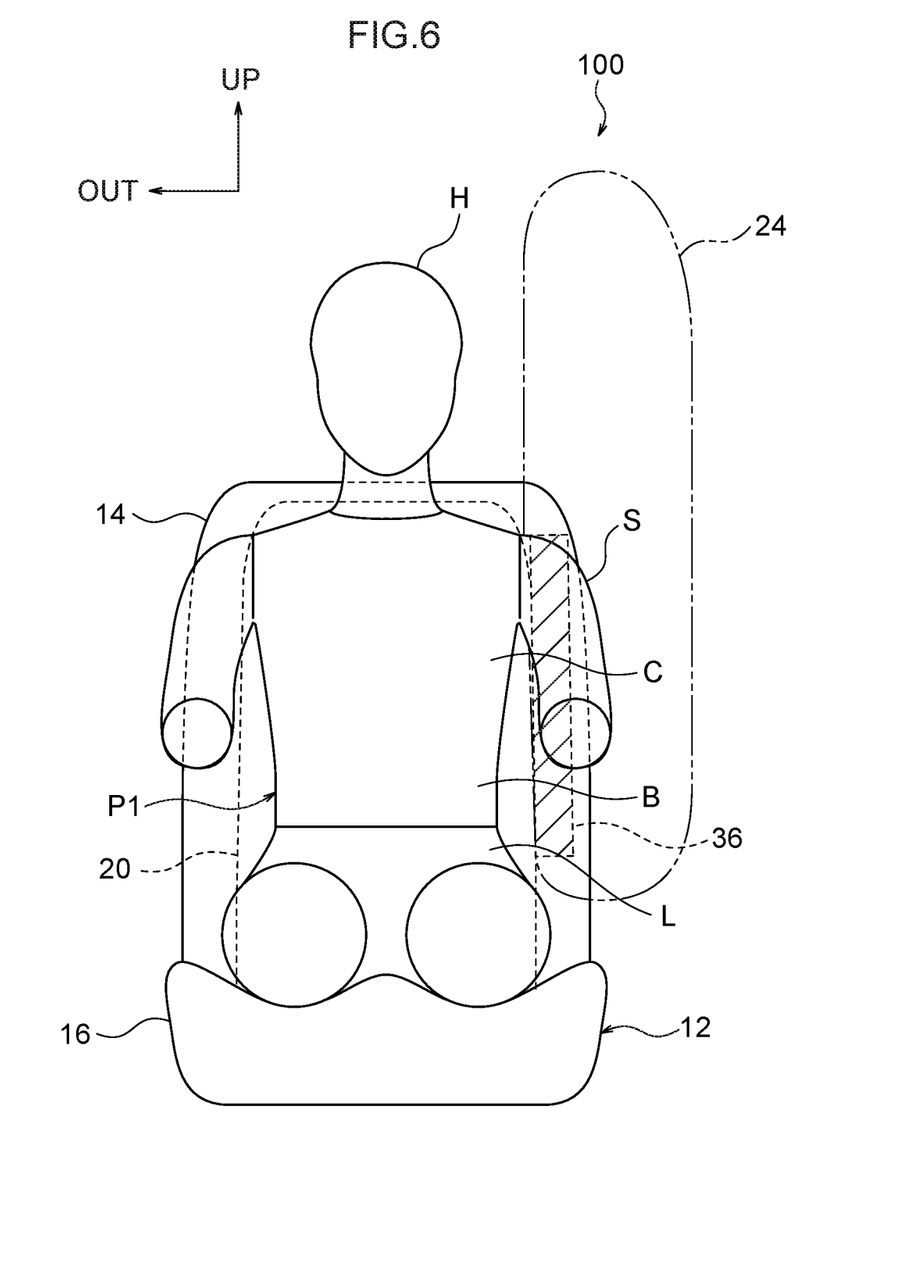
FIG. 6 is a front view of a vehicle seat in which a vehicle far side airbag device according to a comparative example is installed.

Description of the above effects will be supplemented using a comparative example 100 shown in FIG. 6. In FIG. 6, the same reference signs are assigned to configurations that are the same as those described with respect to FIGS. 1-5. The comparative example 100 does not include the outer tether 34, the inner tether 32, and the plate 30, and the region from the head H to the waist L of the occupant P1 is protected by the side airbag 24. In the comparative example 100, the shoulder S of the occupant P1 is in the deployment direction of the side airbag 24 that inflates and deploys from the central side portion 14A. For this reason, there is the potential for the side airbag 24 to catch on the rear side of the shoulder S at the time of the inflation and deployment and no longer inflate and deploy to the intended position, but in the present embodiment this can be avoided.

Moreover, in the present embodiment, the upper end portion 34T of the distal end portion of the outer tether 34 is positioned on the seat upper side of the center SC of the shoulder S of the occupant P1 when the side airbag 24 in the inflated and deployed state is viewed in the seat width direction. Because of this, the deployment direction of the side airbag 24 is guided outward in the seat width direction by the outer tether 34 as far as the seat upper side of the center SC of the shoulder S, so the side airbag 24 can be effectively prevented or inhibited from catching on the rear side of the shoulder S.

Furthermore, in the present embodiment, the deployment direction of the side airbag 24 can be controlled by the outer tether 34 and the inner tether 32, so the side airbag 24 can be stably inflated and deployed in the narrow space between the shoulder S of the occupant P1 and the shoulder S of the occupant P2 (see FIG. 4). In FIG. 4, θ1 is set to about 20 degrees for example and θ2 is set to about 30 degrees for example. By guiding the deployment direction of the side airbag 24 in the range of θ1 to θ2, it can be ensured that the side airbag 24 does not interfere not just with the shoulder S of the occupant P1 but also with the shoulder S of the occupant P2.

Moreover, in the present embodiment, as mentioned above, further toward the lower end side of the side airbag 24 than the upper end portion 32T of the distal end portion of the inner tether 32, the side airbag 24 can be inflated and deployed in the normal direction (the seat forward direction). Because of this, the side airbag 24 can be inflated and deployed from the waist L of the occupant P1 to a position close to the chest C, so the ability of the side airbag 24 to initially restrain the region from the waist L to the chest C can be well ensured.

Furthermore, in the present embodiment, the far side airbag device 10 is equipped with the plate 30 that is formed in the shape of an elongated plate whose longitudinal direction coincides with the height direction of the seat back 14, is placed between the side airbag 24 and the side frame 22, and is secured to the side frame 22. For this reason, the side airbag 24 is pressed against the plate 30 by the tensile forces T1 and T2 when the inner tether 32 and the outer tether 34 are stretched by the inflation and deployment of the side airbag 24. Back-and-forth swinging of the side airbag 24 in the rightward and leftward direction (the seat width direction) at the time of the inflation and deployment can be inhibited by a reaction force P of this pressing action (see FIG. 3), so the deployment behavior of the side airbag 24 can be stabilized even more.

That is, in the present embodiment, as shown in FIG. 3, the front edge of the plate 30 is positioned further in the forward direction of the seat back 14 than the centerline of the upper and lower stud bolts 26A of the inflator 26. Because of this, when the side airbag 24 tries to rotate about the inflator 26 due to the load in the seat leftward direction (see arrow F3 in FIG. 3), a moment counter to this rotation can be made to act on the side airbag 24 in correspondence to a distance L1 along the seat back forward and rearward direction between the centerline and the front edge of the plate 30.

Furthermore, in the present embodiment, the rear edge of the plate 30 is positioned further in the rearward direction of the seat back 14 than the centerline of the upper and lower stud bolts 26A of the inflator 26. Because of this, when the side airbag 24 tries to rotate about the inflator 26 due to the load in the seat rightward direction (see arrow F4 in FIG. 3), a moment counter to this rotation can be made to act on the side airbag 24 in correspondence to a distance L2 along the seat back forward and rearward direction between the centerline and the rear edge of the plate 30. For the above reasons, the stiffness of the side airbag 24 with respect to the loads in the seat rightward and leftward direction is improved (displacement is reduced), so the deployment behavior of the side airbag 24 can be stabilized. Moreover, the occupant restraining force of the side airbag 24 can be increased by the moments, which also contributes to improving the occupant restraining performance.

Moreover, in the present embodiment, the gas generated from the inflator 26 inside the rear bag portion 44 of the side airbag 24 is supplied to the inside of the front bag portion 42 through the upper communicating opening 46 and the lower communicating opening 48 disposed in the partitioning portion 40. Because of this, the rear bag portion 44 inflates and deploys earlier and to a higher pressure than the front bag portion 42. The periphery of the rear bag portion 44 is surrounded by the inner tether 32 and the outer tether 34, so when the inner tether 32 and the outer tether 34 become stretched, unintended displacement of the high-pressure rear bag portion 44 is inhibited by the tensile forces T1 and T2 of the outer tether 34 and the inner tether 32.

That is, the tensile forces T1 and T2 of the outer tether 34 and the inner tether 32 increase in comparison to a case where the side airbag 24 is not partitioned into the high-pressure rear bag portion 44 and the low-pressure front bag portion 42, so the rear bag portion 44 is strongly restrained by these increased tensile forces T1 and T2. Because of this, back-and-forth swinging of the rear bag portion 44 at the time of the inflation and deployment is inhibited, and back-and-forth swinging of the low-pressure front bag portion 42 at the time of the inflation and deployment is inhibited because the low-pressure front bag portion 42 is supported by the high-pressure rear bag portion 44. For the above reasons, the deployment behavior of the side airbag 24 can be stabilized even more.

Moreover, because the tensile forces T1 and T2 increase as described above, the pressing reaction force P that the high-pressure rear bag portion 44 receives from the plate 30 increases, so the back-and-forth swinging inhibiting effect resulting from the pressing reaction force P can be enhanced. Moreover, the moments also increase, so rotation of the rear bag portion 44 centered on the inflator 26 can be effectively inhibited and displacement of the front bag portion 42 accompanying this rotation of the rear bag portion 44 can also be inhibited. Because of this, the waist L and so forth of the occupant P1 can be strongly restrained (protected) by the side airbag 24, so the occupant restraining performance of the side airbag 24 can be effectively improved.

Furthermore, in the present embodiment, the plate 30 and the rear edge portions 32R and 34R of the inner tether 32 and the outer tether 34 are secured to the side frame 22 using the inflator 26 housed inside the side airbag 24. Because the far side airbag device 10 is configured in this way, the plate 30 and the inner tether 32 and the outer tether 34 can be easily secured to the side frame 22 together with the side airbag 24.

Furthermore, the rear edge portion 32R of the inner tether 32 and the rear edge portion 34R of the outer tether 34 are sandwiched between the side frame 22 and the plate 30, so a wide range of the rear edge portions 32R and 34R can be well restrained on the side frame 22. Because of this, the tensile forces T1 and T2 and the moments can be well generated.

Next, another embodiment of the present disclosure will be described. In regard to configurations and action that are basically the same as those described with respect to FIGS. 1-5, reference signs that are the same as those described with respect to FIGS. 1-5 will be used and descriptions thereof will be omitted.

Second Embodiment

Figure 7:
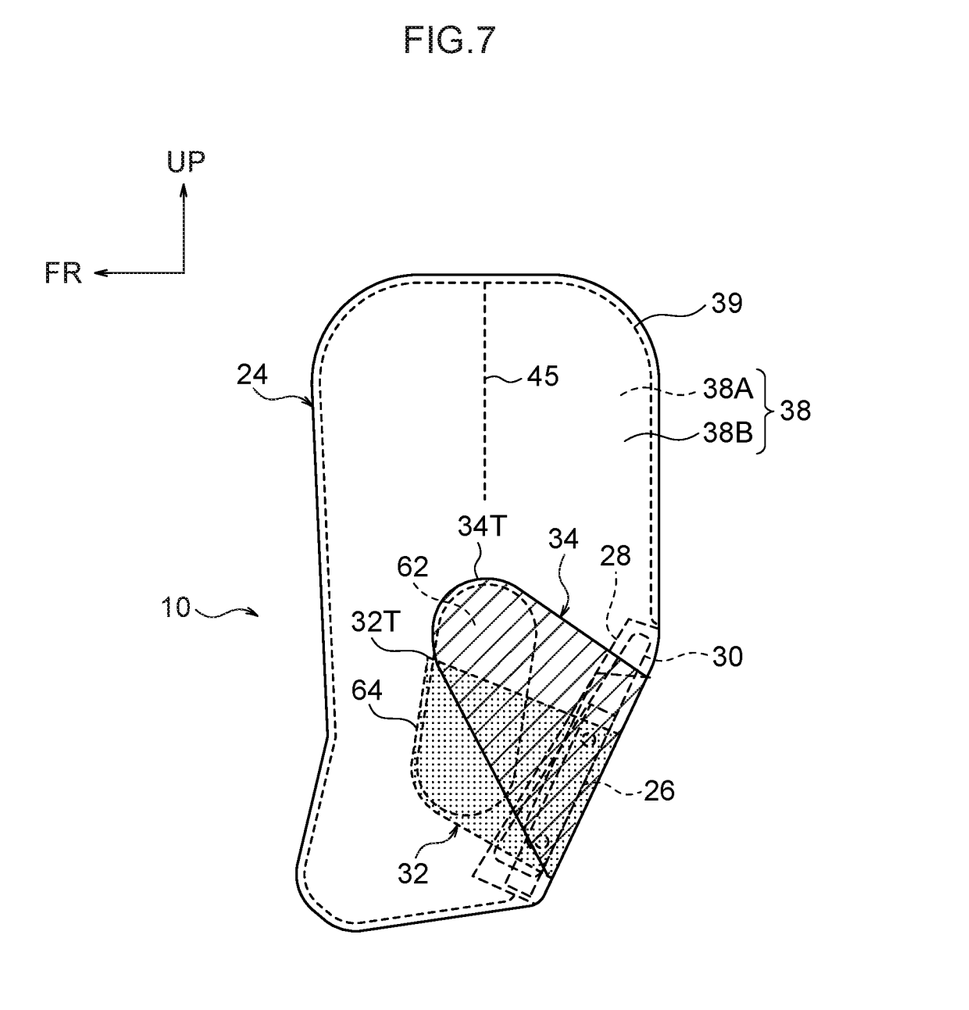
FIG. 7 is a side view, corresponding to FIG. 2, showing the inflated and deployed state of the far side airbag in a vehicle far side airbag device according to a second embodiment of the present disclosure.

In FIG. 7 the inflated and deployed state of the side airbag 24 in a vehicle far side airbag device 70 according to a second embodiment of the present disclosure is shown by way of a side view corresponding to FIG. 2. In this embodiment, a non-inflating portion 62 for inflation pressure adjustment is disposed in the forward and rearward direction middle portion of the lower portion of the side airbag 24, and the partitioning portion 40 is omitted. That is, in this embodiment, the side airbag 24 is a so-called single chamber side airbag. The non-inflating portion 62 is formed in the shape of a rectangular with semicircular ends, whose long axis lies along the height direction of the side airbag 24, as a result of the inner portion 38A and the outer portion 38B of the base cloth 38 being sewn together by a loop-shaped seam 64. The non-inflating portion 62 is configured to regulate the inflation of the part of the side airbag 24 that restrains at least the shoulder S (not shown in FIG. 7) of the occupant P1. Furthermore, in the present embodiment, the distal end portion of the inner tether 32 and the distal end portion of the outer tether 34 are sewn (anchored) to the forward and rearward direction middle portion of the side airbag 24 at the seam 64. Configurations other than those described above are the same as those described with respect to FIGS. 1-5.

In the present embodiment also, basically the same action and effects as those described with respect to FIGS. 1-5 are achieved. Furthermore, in this embodiment, the non-inflating portion 62 is disposed in the side airbag 24, so the inflated and deployed side airbag 24 can be prevented or inhibited from interfering with the shoulder S and escaping to the vehicle width direction central side. The shape of the non-inflating portion 62 is not limited to being rectangular with semicircular ends and can be appropriately changed in some embodiments.

Supplemental Description of the Embodiments

In each of the above embodiments, the rear edge portion 34R (base end portion) of the outer tether 34 and the rear edge portion 32R (base end portion) of the inner tether 32 are anchored (secured) to the side frame 22 using the inflator 26 housed inside the side airbag 24, but the present disclosure is not limited to this. For example, in some embodiments, the rear edge portion 34R of the outer tether 34 is anchored to the distal end portion of the rear flange portion 22C of the side frame 22 using a hook-shaped member disposed on the rear edge portion 34R. Furthermore, in some embodiments for example, the rear edge portion 32R of the inner tether 32 is anchored to the distal end portion of the front flange portion 22B of the side frame 22 using a hook-shaped member disposed on the rear edge portion 32R. Furthermore, in some embodiments for example, a plate-shaped anchoring member is attached to the rear edge portion 34R of the outer tether 34, and the anchoring member is fastened and secured to the back surface (the surface on the seat rear side) of the rear flange portion 22C. Furthermore, in some embodiments for example, the rear edge portion 32R of the inner tether 32 and the rear edge portion 34R of the outer tether 34 are fastened and secured to the seat width direction inner surface of the side wall portion 22A using the upper and lower stud bolts 26A and the upper and lower nuts 27.

Furthermore, in each of the above embodiments, the far side airbag device includes the plate 30, but the present disclosure is not limited to this, and, in some embodiments, the plate 30 is omitted. Furthermore, in each of the above embodiments, a plate holding portion for holding the plate 30 in the side airbag 24 is also disposed in the side airbag 24. Namely, in some embodiments for example, a bag-shaped (pocket-shaped) plate holding portion is formed by sewing a piece of cloth having a shape similar to that of the plate 30 to the rear end portion of the side airbag 24, and the plate 30 is inserted in (put into) the plate holding portion. Because of that, work when modularizing the plate 30 and so forth together with the side airbag 24 becomes easy.

Furthermore, in each of the above embodiments, the plate 30 is formed in the shape of a flat plate, but the present disclosure is not limited to this, and the shape of the plate 30 can be appropriately changed in some embodiments. For example, in some embodiments, the plate 30 is formed in a cross-sectional L-shape, an extended part of the plate 30 extends on the seat rear side of the rear flange portion 22C of the side frame 22, and the middle portion of the outer tether 34 between its base end portion and its distal end portion is held by the extended part. Because of that, the tensile force T1 of the outer tether 34 can be increased.

Furthermore, in each of the above embodiments, the upper end portion 34T of the distal end portion of the outer tether 34 is positioned on the seat upper side of the center SC of the shoulder S of the occupant P1 when the side airbag 24 in the inflated and deployed state is viewed in the seat width direction, but the present disclosure is not limited to this, and the upper end portion 34T in some embodiments is positioned on the seat lower side of the center SC.

Furthermore, in each of the above embodiments, the outer tether 34 and the inner tether 32 are each made of a single cloth, but the present disclosure is not limited to this, and one or both of the outer tether and the inner tether in some embodiments is divided above and below into plural cloths. Furthermore, in each of the above embodiments, the distal end portions of the outer tether 34 and the inner tether 32 are anchored to the forward and rearward direction middle portion of the side airbag 24, but the present disclosure is not limited to this, and the distal end portion(s) of one or both of the outer tether 34 and the inner tether 32 in some embodiments is/are anchored to the front end side of the side airbag 24. Furthermore, the distal end portion of the outer tether 34 in some embodiments is anchored to the rear end side of the side airbag 24.

Furthermore, in each of the above embodiments, a case is described where the vehicle far side airbag device 10 inflates and deploys the side airbag 24 from the central side portion 14A (the side portion on the vehicle width direction central side) of the seat back 14, but the present disclosure is not limited to this. Namely, the present disclosure is applicable to a so-called vehicle near side airbag device that inflates and deploys a side airbag from the side portion on the vehicle width direction outer side of the seat back 14. In that case, the side airbag (near side airbag) is formed in a size capable of protecting a region from the shoulder to the abdomen or waist of the seated occupant, for example.

In addition, the present disclosure can be changed and implemented in a variety of ways without departing from the spirit thereof. Furthermore, the scope of rights of the present disclosure is of course not limited to the embodiments.

What is claimed is:

1. A vehicle side airbag device, comprising:
   a side airbag that is configured to
      be stored inside a side portion of a seat back of a vehicle seat, and secured to a side frame of the seat back, and
      receive a supply of gas from an inflator to inflate and deploy to an inflated and deployed state on a side of a seated occupant on the vehicle seat and protect at least a region from the shoulder to the abdomen of the seated occupant;
   an inner tether that has a base end portion configured to be anchored to the side frame, extends in a seat forward direction at a seat width direction inner side of the side airbag in the inflated and deployed state, has a distal end portion anchored to the side airbag, and is configured to be stretched at a time of inflation and deployment of the side airbag;
   an outer tether that has a base end portion configured to be anchored to the side frame, extends outward in a seat width direction from a seat rear side of the side airbag in the inflated and deployed state, has a distal end portion anchored to the side airbag, and is configured to be stretched at the time of the inflation and deployment of the side airbag;
   a plate placed between the side airbag and the base end portions of the outer tether and the inner tether; and
   a bolt which penetrates the base end portion of the outer tether, the base end portion of the inner tether, the plate, and the side airbag, and is configured to secure the inflator, the base end portion of the outer tether, the base end portion of the inner tether, the plate, and the side airbag to the side frame, wherein an upper end portion of the distal end portion of the outer tether is positioned further toward an upper end side of the side airbag than an upper end portion of the distal end portion of the inner tether.

2. The vehicle side airbag device of claim 1, wherein the upper end portion of the distal end portion of the outer tether is configured to be positioned at an upper side of a center of the shoulder of the seated occupant when the side airbag in the inflated and deployed state is viewed in the seat width direction, and
the seated occupant is a standard crash test dummy.

3. The vehicle side airbag device of claim 1, wherein the side airbag includes a partitioning portion which partitions the side airbag into a front bag portion and a rear bag portion, the partitioning portion having communicating openings which communicate the front bag portion with the rear bag portion;
the vehicle side airbag device further comprises the inflator which is housed inside the rear bag portion; and
a periphery of the rear bag portion is surrounded by the outer tether and the inner tether.

4. The vehicle side airbag device of claim 1, wherein the plate is configured to be placed between the side airbag and the side frame.

5. The vehicle side airbag device of claim 4, wherein the plate is an elongated plate having a longitudinal direction configured to coincide with a height direction of the seat back.

6. The vehicle side airbag device of claim 4, wherein a dimension of the plate in the seat forward direction becomes smaller heading from a lower end side of the plate to an upper end side of the plate.

7. The vehicle side airbag device of claim 3, wherein in the inflated and deployed state of the side airbag, an upper end of the plate is positioned in a vicinity of an upper end of the rear bag portion and a lower end of the plate is positioned in a vicinity of a lower end portion of the rear bag portion.

8. The vehicle side airbag device of claim 1, wherein the side airbag includes a non-inflating portion for inflation pressure adjustment, and the non-inflating portion is disposed in a forward and rearward direction middle portion of a lower portion of the side airbag.

9. The vehicle side airbag device of claim 1, wherein the vehicle side airbag device further comprises the inflator housed inside the side airbag, and
the base end portion of the outer tether and the base end portion of the inner tether are configured to be placed between the side airbag and the side frame, and to be secured to the side frame using the inflator housed inside the side airbag.

10. The vehicle side airbag device of claim 1, further comprising:
the inflator housed inside the side airbag.

11. The vehicle side airbag device of claim 10, wherein:
the side airbag includes a partitioning portion which partitions the side airbag into a front bag portion and a rear bag portion, the partitioning portion having communicating openings which communicate the front bag portion with the rear bag portion,
the inflator is housed inside the rear bag portion; and
a periphery of the rear bag portion is surrounded by the outer tether and the inner tether.

12. The vehicle side airbag device of claim 11, wherein when the side airbag is in the inflated and deployed state, a length of the outer tether on the periphery of the rear bag portion is greater than a length of the inner tether on the periphery of the rear bag portion.

13. The vehicle side airbag device of claim 11, wherein the distal end portion of the outer tether and the distal end portion of the inner tether are anchored to the side airbag at the partitioning portion.

14. A vehicle side airbag device, comprising:
a side airbag that is configured to
be stored inside a side portion of a seat back of a vehicle seat, and secured to a side frame of the seat back, and
receive a supply of gas to inflate and deploy to an inflated and deployed state;
an inner tether that has a base end portion configured to be anchored to the side frame, extends in a seat forward direction at a seat width direction inner side of the side airbag in the inflated and deployed state, has a distal end portion anchored to the side airbag, and is configured to be stretched at a time of inflation and deployment of the side airbag;
an outer tether that has a base end portion configured to be anchored to the side frame, extends outward in a seat width direction from a seat rear side of the side airbag in the inflated and deployed state, has a distal end portion anchored to the side airbag, and is configured to be stretched at the time of the inflation and deployment of the side airbag; and
a plate configured to be placed between the side airbag and the side frame, and to be secured to the side frame, wherein
an upper end portion of the distal end portion of the outer tether is positioned further toward an upper end side of the side airbag than an upper end portion of the distal end portion of the inner tether,
the side airbag includes a partitioning portion which partitions the side airbag into a front bag portion and a rear bag portion, the partitioning portion having communicating openings which communicate the front bag portion with the rear bag portion, and
in the inflated and deployed state of the side airbag, an upper end of the plate is positioned in a vicinity of an upper end of the rear bag portion and a lower end of the plate is positioned in a vicinity of a lower end portion of the rear bag portion.

15. The vehicle side airbag device of claim 14, wherein a periphery of the rear bag portion is surrounded by the outer tether and the inner tether.

16. The vehicle side airbag device of claim 15, wherein when the side airbag is in the inflated and deployed state, a length of the outer tether on the periphery of the rear bag portion is greater than a length of the inner tether on the periphery of the rear bag portion.

17. The vehicle side airbag device of claim 15, wherein the distal end portion of the outer tether and the distal end portion of the inner tether are anchored to the side airbag at the partitioning portion.

18. The vehicle side airbag device of claim 14, wherein the plate is placed between the side airbag and the base end portions of the outer tether and the inner tether; and
the vehicle side airbag device further comprises a bolt which penetrates the base end portion of the outer tether, the base end portion of the inner tether, the plate, and the side airbag, and is configured to secure the base end portion of the outer tether, the base end portion of the inner tether, the plate, and the side airbag to the side frame.

19. A vehicle seat, comprising:
a seat back having a side frame;
a side airbag that is stored inside a side portion of the seat back, is secured to the side frame of the seat back, and is configured to receive a supply of gas from an inflator to inflate and deploy to an inflated and deployed state on a side of a seated occupant on the vehicle seat and protect at least a region from the shoulder to the abdomen of the seated occupant;
an inner tether that has a base end portion anchored to the side frame, extends in a seat forward direction at a seat width direction inner side of the side airbag in the inflated and deployed state, has a distal end portion anchored to the side airbag, and is configured to be stretched at a time of inflation and deployment of the side airbag; and
an outer tether that has a base end portion anchored to the side frame, extends outward in a seat width direction from a seat rear side of the side airbag in the inflated and deployed state, has a distal end portion anchored to the side airbag, and is configured to be stretched at the time of the inflation and deployment of the side airbag,
wherein
an upper end portion of the distal end portion of the outer tether is positioned further toward an upper end side of the side airbag than an upper end portion of the distal end portion of the inner tether,
the vehicle seat further comprises the inflator housed inside the side airbag, and
the base end portion of the outer tether and the base end portion of the inner tether are placed between the side airbag and the side frame, and are secured to the side frame using the inflator housed inside the side airbag.

* * * * *